United States Patent [19]

Wertheim

[11] Patent Number: 4,902,586
[45] Date of Patent: Feb. 20, 1990

[54] ONCE THROUGH MOLTEN CARBONATE FUEL CELL SYSTEM

[75] Inventor: Ronald J. Wertheim, Hartford, Conn.

[73] Assignee: International Fuel Cells Corporation, South Windsor, Conn.

[21] Appl. No.: 399,674

[22] Filed: Aug. 28, 1989

[51] Int. Cl.$^4$ ............................................. H01M 8/14
[52] U.S. Cl. ....................................... 429/20; 429/16; 429/17
[58] Field of Search ....................... 429/16, 17, 18, 19, 429/20, 26, 12

[56] References Cited

U.S. PATENT DOCUMENTS

| | | | |
|---|---|---|---|
| 3,976,507 | 8/1976 | Bloomfield | 429/17 |
| 4,041,210 | 8/1977 | Van Dine | 429/16 |
| 4,200,682 | 4/1989 | Sederquist | 429/17 |
| 4,415,484 | 11/1983 | Setzer et al. | 502/332 |
| 4,473,543 | 9/1984 | Setzer et al. | 423/652 |
| 4,678,723 | 7/1987 | Wertheim | 429/17 |

Primary Examiner—Anthony Skapars
Attorney, Agent, or Firm—Charles E. Sohl

[57] ABSTRACT

A molten carbonate fuel cell system wherein the cathode effluent gases are utilized in an autothermal autothermal reformer, and the anode gas is not recycled.

5 Claims, 1 Drawing Sheet

MOLTEN CARBONATE FUEL CELL SYSTEM

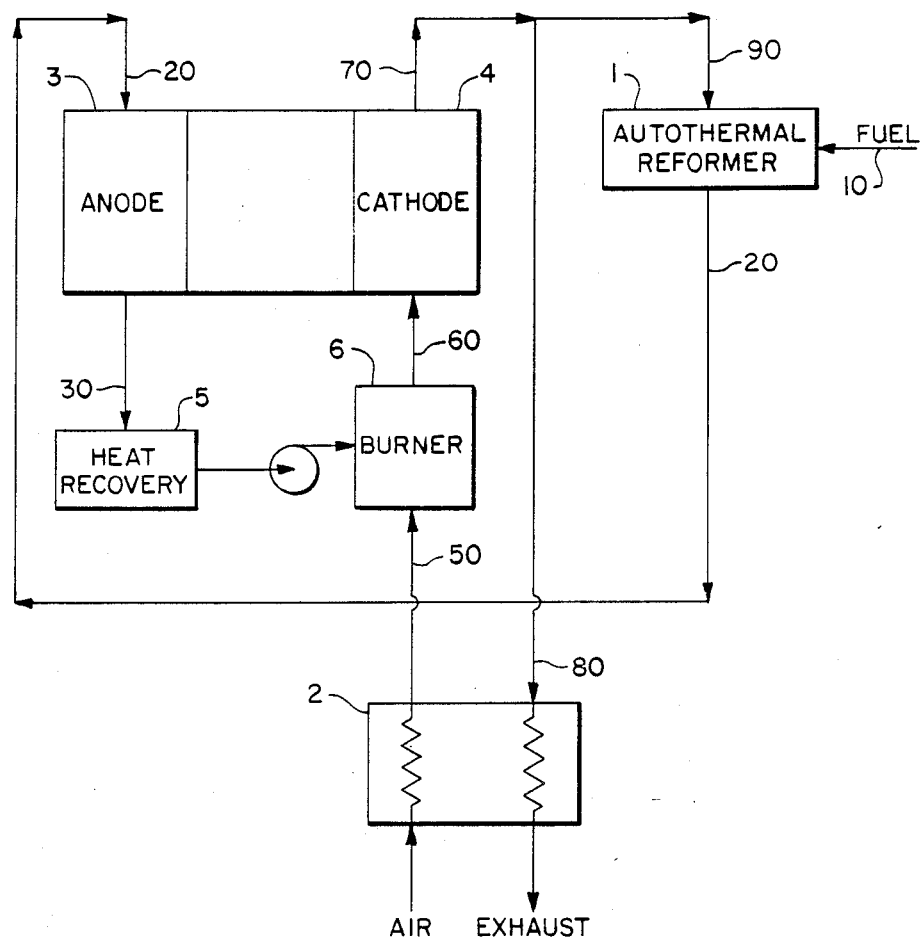
MOLTEN CARBONATE FUEL CELL SYSTEM

ONCE THROUGH MOLTEN CARBONATE FUEL CELL SYSTEM

DESCRIPTION

1. Technical Field

This invention relates to a fuel cell system, and especially to a molten carbonate fuel cell system.

2. Background Art

The use of oxidant/fuel reactions to produce electricity within fuel cells is well known in the art. In a molten carbonate fuel cell, oxygen reacts with carbon dioxide to form carbonate ions. The ions cross an ion exchange membrane where they react with hydrogen to form water, carbon dioxide, and free electrons.

Various techniques have been developed to improve fuel cell efficiency. One of these techniques, as disclosed in U.S. Pat. No. 3,976,507 (incorporated herein by reference), comprises operating a fuel cell under pressure. Compressed air passes through the cathode side of the cell into an autothermal reformer (ATR) where it is introduced to unprocessed or raw fuel. The gases exit the ATR, pass through the anode side of the cell, and are burned in a reactor. This exothermic reaction increases the gas temperature. The hot gases then enter the turbo-compressor apparatus for powering said apparatus.

Another technique, disclosed in U.S. Pat. No. 4,041,210 (incorporated herein by reference), includes utilizing the waste heat generated by a molten carbonate fuel cell stack to drive a turbocharger and power a bottoming cycle. U.S. Pat. No. 4,200,682 (incorporated herein by reference), on the other hand, discloses a method of heating the reformer by burning anode exhaust with air in a reactor, and using the combusted anode exhaust along with fuel to within the reformer.

The object of the present invention is to provide an improved molten carbonate fuel cell system which utilizes the cathode exhaust in the reformer.

Another object of the present invention is to provide a system where it is not necessary to recycle the anode exhaust, reducing cell cross pressure concerns.

DISCLOSURE OF INVENTION

This invention involves an improved molten carbonate fuel cell system arrangement. In this system, steam and oxygen required for the ATR (auto thermal reformer) are obtained from the cathode exhaust. Fuel and cathode exhaust enter the ATR where partial oxidation and steam reforming reactions occur. The gases then enter the anode chamber where hydrogen and carbonate ions react exothermically to form water, carbon dioxide, and electrons. The anode effluent gases, from which high grade heat can be recovered, pass through a burner. Within the burner, air is introduced and the excess hydrogen is burned. The burner exhaust is then fed to the cathode chamber. Some of the nitrogen, water, and carbon dioxide in the cathode effluent gases are exhausted into the atmosphere, while the remainder of the gases flow to the ATR.

The foregoing and other features and advantages of the present invention will become more apparent from the following description and accompanying drawings.

BRIEF DESCRIPTION OF DRAWINGS

The figure is a possible embodiment of the present invention.

BEST MODE FOR CARRYING OUT THE INVENTION

One of the advantages of the present invention include eliminating the need for high temperature anode and cathode recycle blowers used in many current molten carbonate systems due to the use of the cathode exhaust within the ATR. Another advantage is, since no indirect heat transfer from a burner to reformer tubes is required, the reactor design is simplified and inexpensive. Also, water recovery is not necessary; the cathode exhaust is utilized in the ATR. Additionally, the evenly distributed flow between the anode and cathode chambers minimizes the cell cross pressure concerns.

Even though this system can be run under pressure for larger applications, the preferred embodiment is small ambient pressure power plants for reasons of practicability; the system can be close-coupled for simplicity and ease of packaging. As shown in the figure, a schematic of a possible embodiment of the present invention, the fuel (10) is introduced to the ATR (1) where it reacts with a portion of the cathode exhaust (90) in partial oxidation and steam reforming reactions. The gas stream (20) then enters the anode chamber (3) where hydrogen and carbonate ions react forming water, carbon dioxide, electrons, and heat. The anode effluent (30) enters a heat recovery unit (5) and then passes to a burner (6) where pre-heated air (50) from heat exchanger (2) is introduced. In the burner (6), excess hydrogen is removed from the system, and the gas stream is heated. The combusted gases (60) are delivered to the cathode chamber (4). where oxygen from the air reacts with electrons which flow through an external load from the anode (3) to the cathode (4), and carbon dioxide, forming carbonate ions. The ions pass through an ion exchange membrane to react with hydrogen in the anode chamber (3). The gases exit (70) the cathode chamber (4); some of the gas, water, carbon dioxide, and nitrogen, is exhausted (80) to the atmosphere, while the remaining gas (90) is used within the ATR (1).

A further advantage of utilizing this embodiment is that the nitrogen in the anode stream (from the air stream) dilutes the anode products (carbon dioxide and water) as well as the reactant hydrogen. The net effect is an increase in the Nernst potential and the cell voltage.

Although this invention has been shown and described with respect to detailed embodiments thereof, it will be understood by those skilled in the art that various changes in form and detail thereof may be made without departing from the spirit and scope of the claimed invention.

We claim:

1. A fuel cell system, which comprises:
    a. a plurality of fuel cells connected electrically through a load, each cell comprising a cathode electrode, an anode electrode, an electrolyte disposed therebetween, a cathode chamber, and an anode chamber;
    b. a autothermal reformer for partial oxidation and steam reforming reactions;
    c. means for introducing fuel wherein said fuel enters the system through the autothermal reformer;
    d. means for delivering the gases from the autothermal reformer to the anode chamber;
    e. means for delivering the gases from a heat recovery means to a burner;

f. means for introducing pre-heated air, said air being a source of oxygen and nitrogen for the system, to said burner wherein excess fuel is burned;

g. means for delivering the resulting gases to the cathode chamber;

h. means for delivering the effluent gases from said cathode chamber to said autothermal reformer;

i. means for exhausting excess gases from the system;

whereby the water produced in the anode chamber and the excess oxygen in the cathode chamber are utilized in the autothermal reformer for the partial oxidation and steam reformation reactions.

2. A fuel cell system as in claim f using molten carbonate fuel cells.

3. A fuel cell system, which comprises:

a. a single fuel cell comprising a cathode electrode, an anode electrode, an electrolyte disposed therebetween, a cathode chamber, and an anode chamber;

b. a autothermal reformer for partial oxidation and steam reforming reactions;

c. means for introducing fuel wherein said fuel enters the system through the autothermal reformer;

d. means for delivering the gases from the autothermal reformer to the anode chamber;

e. means for delivering the gases from a heat recovery means to a burner;

f. means for introducing pre-heated air, said air being a source of oxygen and nitrogen for the system, to said burner wherein excess fuel is burned;

g. means for delivering the resulting gases to the cathode chamber;

h. means for delivering the effluent gases from said cathode chamber to said autothermal reformer;

i. means for exhausting excess gases from the system; whereby the water produced in the anode chamber and the excess oxygen in the cathode chamber are utilized in the autothermal reformer for the partial oxidation and steam reformation reactions.

4. A fuel cell system as in claim 3 using a molten carbonate fuel cell.

5. A molten carbonate fuel cell system, which comprises:

a. a at least one molten carbonate fuel cell connected electrically through a load, each cell comprising a cathode electrode, an anode electrode, an electrolyte disposed therebetween, a cathode chamber, and an anode chamber;

b. a autothermal reformer for partial oxidation and steam reforming reactions;

c. means for introducing fuel wherein said fuel enters the system through the autothermal reformer;

d. means for delivering the gases from the autothermal reformer to the anode chamber;

e. means for delivering the gases from a heat recovery means to a burner;

f. means for introducing pre-heated air, said air being a source of oxygen and nitrogen for the system, to said burner wherein excess fuel is burned;

g. means for delivering the resulting gases to the cathode chamber;

h. means for delivering the effluent gases from said cathode chamber to said autothermal reformer;

i. means for exhausting excess gases from system; whereby the water produced in the anode chamber and the excess oxygen in the cathode chamber are utilized in the autothermal reformer for the partial oxidation and steam reformation reactions.

* * * * *

UNITED STATES PATENT AND TRADEMARK OFFICE
CERTIFICATE OF CORRECTION

PATENT NO. : 4,902,586

DATED : February 20, 1990

INVENTOR(S) : Ronald J. Wertheim

It is certified that error appears in the above-identified patent and that said Letters Patent is hereby corrected as shown below:

Claim 2, column 3, line 13, after "claim" change "fusing" to --1 using--.

Signed and Sealed this

Second Day of April, 1991

Attest:

HARRY F. MANBECK, JR.

Attesting Officer

Commissioner of Patents and Trademarks